H. K. BOSWELL & D. IMMEL.
Thill-Coupling.
No. 162,610.  Patented April 27, 1875.
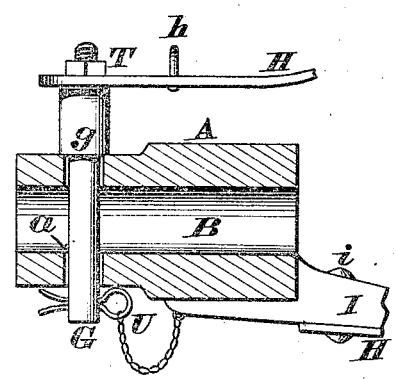
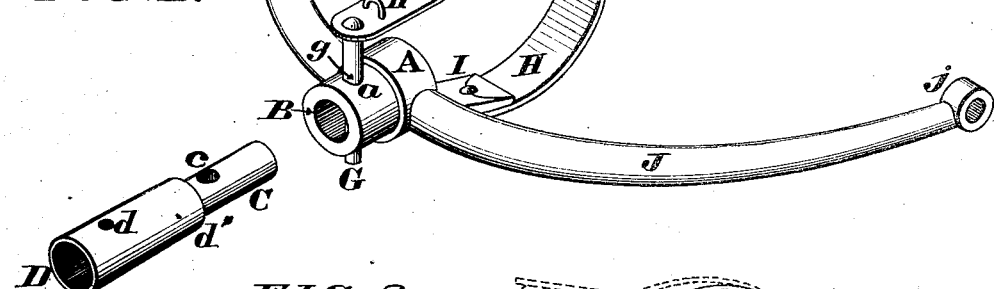
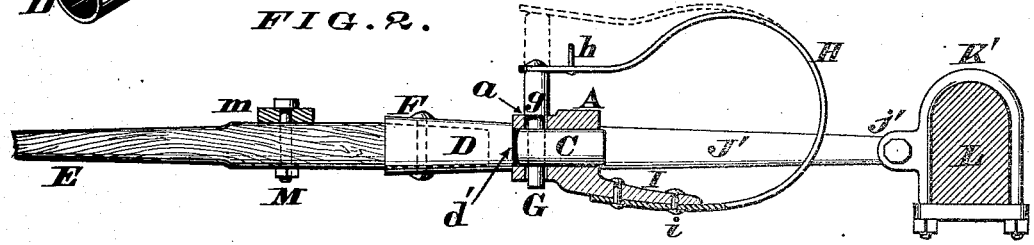
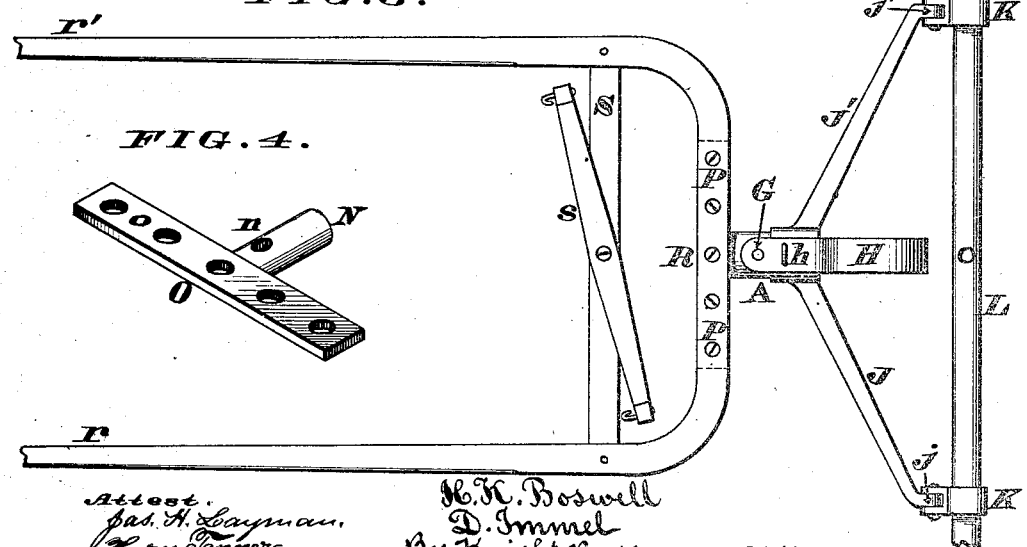

UNITED STATES PATENT OFFICE

HENRY K. BOSWELL AND DAVID IMMEL, OF CINCINNATI, OHIO.

IMPROVEMENT IN THILL-COUPLINGS.

Specification forming part of Letters Patent No. 162,610, dated April 27, 1875; application filed March 25, 1875.

*To all whom it may concern:*

Be it known that we, HENRY K. BOSWELL and DAVID IMMEL, both of Cincinnati, Hamilton county, Ohio, have invented a new and useful Shaft and Pole Coupling, of which the following is a specification:

Our invention relates to a simple and secure coupling, wherewith either a pole or a pair of shafts may be readily attached to or detached from the front axle of any wheeled vehicle, as hereinafter fully described.

In the accompanying drawings, Figure 1 is a perspective view of the coupling detached from the vehicle, the ferrule, for the reception of the pole, being separated from its socket. Fig. 2 is a longitudinal section through the device, the coupling being shown attached to the front axle of a vehicle, and a pole fitted within the ferrule. Fig. 3 is a plan, showing a pair of shafts attached to the coupling. Fig. 4 is a perspective view, showing the detachable T, to which the shafts are secured; and Fig. 5 is vertical section through a modified form of the coupling, this last illustration being drawn on an enlarged scale.

A represents a tubular socket, having a longitudinal bore, B, which is preferably circular, as shown. It may, however, have a square or any other form of a transverse section. The bore B of this metallic socket is adapted to receive the cylindrical shank or stem C of a ferrule, D, within which the butt-end of the pole E is fitted, and secured with a bolt or rivet, F, that passes through suitable apertures $d$ in said ferrule. The shank C is pierced with a perforation, $c$, for a purpose which will presently appear.

Passing vertically through the socket A, and near the front end of the same, is a perforation, $a$, that is traversed by a coupling-pin, G, whose upper extremity is secured to the free end of a curved plate-spring, H, although a spiral or other spring may be employed, if preferred. The pin G has a shoulder, $g$, upon it, which shoulder limits the descent of the said pin into the perforation $a$. The plate-spring H curves rearwardly, and is thence bent toward the socket A, the fixed end of said spring being attached, by means of rivets $i$, to a lug, I, which projects rearward from the previously-described tubular socket.

Secured near the free end of spring H is a staple or ring, $h$, to which a cord may be attached and thence be carried into the vehicle, for the purpose of enabling the driver to liberate the coupling-pin from its socket, whenever the horse or horses attempt to run away; or the butt-end of the driver's whip may have a hook attached to it, for engagement with the aforesaid ring $h$.

Projecting laterally and rearwardly from the socket A are two bars or arms, J J', whose respective extremities have eyes $j j'$, wherewith said bent bars are attached to clips K K', which latter are secured to the front axle L of the vehicle. These clips may, however, be omitted, and the bars be attached directly to the axle, by means of bolts or rivets, or they may be welded to the iron portion of the axle. M is the king-bolt, that unites the doubletree $m$ to the pole E.

In order that a pair of shafts may be readily applied to the socket, we provide another shank or stem, N $n$, which is similar to the one previously described, with the exception that the ferrule D is dispensed with, and a plate, O, substituted for it. This plate is flat, and, when welded to the front end of shank N forms a T-shaped member, which is complete in itself. Said plate is perforated at O, to receive bolts, screws, or rivets P, that serve to unite the connecting portion R of the shafts $r r'$ to the detachable T. Secured to the said shafts is a rail, S, to which the single-tree $s$ is pivoted.

If preferred, the upper end of coupling-pin G may be screw-threaded, and secured to the spring H by a nut, T; and a spring-pin, U, or its equivalent, may be employed for retaining said coupling-pin securely within the socket A, this modification of the improvement being shown in Fig. 5.

After the socket A has once been secured to the axle L, either by means of the arms J J' or by any other suitable attachments, it will be an easy matter to couple a pole or pair of shafts to the vehicle.

To attach the pole E the spring H is sprung upwardly, as shown by dotted lines in Fig. 2, so as to withdraw the coupling-pin G far enough out of the perforation $a$ to allow the shank C of pole-ferrule D to enter the bore B of socket A. As soon as the shoulder $d'$ of said ferrule comes in contact with the front end of socket A, the spring is liberated, and its stress then forces the pin G down through perforations $a$ and $c$, and thus secures the pole to the vehicle in the most expeditious manner.

To disengage the pole, the pin is elevated, the shank C withdrawn, and the shank N applied in precisely the same manner, providing it be desired to couple the shafts $r\ r'$ to the vehicle.

It will be seen that the stress or downward pressure of spring H serves to maintain the pin G in such position as to lock the shank B or N securely in the socket, and, consequently, there can be no accidental withdrawal either of the pole or shafts, and especially is this true if the retaining device U be employed.

The ability to detach either pole or shafts, by simply elevating the free end of spring H, will prevent the damage and the destruction of life or limb that usually ensues from a runaway.

Instead of the bars J J', ears or lugs may project laterally from the socket A, and in this condition the coupling may be furnished to the trade, leaving the carriage-maker at liberty to attach it to the vehicle in any suitable or convenient manner.

We claim as new and of our invention herein—

1. The combination of socket A $a$ B, coupling-pin G, and spring H, for attachment of the shanks C $c$ D or N $n$ O, substantially as set forth.

2. In combination with the socket A $a$ B, and the coupling-pin G, the ring or staple $h$, shanks C $c$ and N $n$ O, as set forth.

In testimony of which invention we hereunto set our hands.

HENRY K. BOSWELL.
DAVID IMMEL.

Witnesses:
GEO. H. KNIGHT,
JAMES H. LAYMAN.